United States Patent [19]
Nordin

[11] Patent Number: 5,615,114
[45] Date of Patent: Mar. 25, 1997

[54] METHOD FOR MAPPING SEA LEVEL UNDULATIONS WITH APPLICATIONS TO MINERAL AND HYDROCARBON PROSPECTING

[75] Inventor: Per-Gunnar Nordin, Lund, Sweden

[73] Assignee: Petroscan AB, Goteborg, Sweden

[21] Appl. No.: 622,553

[22] Filed: Dec. 5, 1990

Related U.S. Application Data

[63] Continuation-in-part of Ser. No. 136,710, Dec. 22, 1987, Pat. No. 5,001,634, which is a continuation-in-part of Ser. No. 946,428, Dec. 23, 1986, abandoned.

[51] Int. Cl.$^6$ ..................................................... G06F 19/00
[52] U.S. Cl. .................................................................. 364/420
[58] Field of Search ......................... 364/420; 73/170 R, 73/170 A, 382 G, 170.29, 170.32; 342/25, 120, 123, 190, 191; 324/323, 330

[56] References Cited

U.S. PATENT DOCUMENTS

| | | | |
|---|---|---|---|
| 3,038,338 | 6/1962 | Boitnott | 73/382 R |
| 3,242,736 | 3/1966 | Winter et al. | 73/384 |
| 3,888,122 | 6/1975 | Black | 73/382 R |
| 4,244,223 | 1/1981 | Geiger | 73/382 G |
| 4,321,601 | 3/1982 | Richman | 342/25 |
| 4,532,605 | 7/1985 | Waller . | |
| 5,001,634 | 3/1991 | Nordin | 364/420 |

FOREIGN PATENT DOCUMENTS

| | | |
|---|---|---|
| 0294464B1 | 2/1991 | European Pat. Off. . |
| 81/00307 | 2/1981 | WIPO . |
| 86/01592 | 3/1986 | WIPO . |

OTHER PUBLICATIONS

Dobrin, M.B. "Introduction to Geophysical Prospecting", 3rd edition, McGraw–HIll 1970, pp. 436–454.

Hewlett–Packard, Owner's Handbook, pp. 54–55 and Appendix A.

Nash and Jordan, Statistical Geodesy—An Engineering Perspective, vol. 66, No. 5, Proceedings of the IEEE 531–550 (May 1978); see p. 541f, paragraph IV D, in particular p. 543, subparagraph 3.

Alder and Roessler, Introduction to Probability and Statistics (W. H. Freeman and Company), pp. 283–307 and pp. 195–205.

Fuller, Introduction to Statistical Time Series (Wayne A. Fuller), pp. 387, 419.

Dorman, The Use of Nonlinear Functional Expansions in Calculation of the Terrain Effect in Airborne and Marine Gravimetry and Gradiometry, vol. 39, Nos. 1–6, Geophysics 33–38 (1974).

Vonbun, Marsh, Skylab Earth Resources Experiment Package (EREP): Sea Surface Topography Experiment, vol. 13, No. 4, Journal of Spacecraft and Rockets 248–250 (Apr. 1976).

Moore, Imaging Radars for Geoscience Use, IEEE Transactions on Geoscience Electronics 155–164 (Jul. 1971).

(List continued on next page.)

*Primary Examiner*—Donald E. McElheny, Jr.
*Attorney, Agent, or Firm*—Arnold, White & Durkee

[57] ABSTRACT

A method of making an area map for a representation of local variations in the position of a geoid which have an amplitude of less than about one meter and are caused by density variations in the underlying sea floor. The map or representation is intended primarily for use in the determination of areas of the sea floor with increased probability of deposits of natural resources such as oil and gas and the like. The method includes obtaining height values which indicate the sea surface height in relation to a reference level and which are calculated using altimeter data from aircraft or satellites. The obtained height values are sorted to remove incorrect and improbable values, and are adapted to one another based on the different orbits of the flying craft to obtain maximum agreement among the values to establish relative values of the geoid. These adapted height values are filtered to remove long-wave variations, are amplified and adjusted to compensate for water depth, isostatic effects and effects from any land within the area observed.

18 Claims, 11 Drawing Sheets

OTHER PUBLICATIONS

Apel, Wilson, A Review of Major Scientific Results from U.S. Satellite Altimetry and Projections for the Future, 7 marine Geophysical Researches 1–16 (1984).

Fifield, The Shape of Earth From Space, New Scientist (Nov. 25, 1984).

New Analytical Technique Boosts Odds in Exploration, Ocean Industry, May 1985.

Rapp, The Determination of Geoid Undulation and Gravity Anomalies from SEASAT Altimeter Data, vol. 88, No. C3, Journal of Geophysical Research, 3281–3296 (Feb. 28, 1983).

Lerch, Marsh, Kloski, Williamson, Gravity Model Improvements for SEASAT, vol. 87, No. C5, Journal of Geophysical Research 3281–3296 (Apr. 30, 1982).

Brammer, Sailor, Preliminary Estimates of the Resolution Capability of the SEASAT Radar Altimeter, vol. 7, No. 3, Geophysical Research Letter, 193–196 (Mar. 1980).

Rapp, Gravity Anomalies and Sea Surface Heights Derived From a Combined GEOS Seasat Altimeter Data Set, vol. 91, No. B5, Journal of Geophysical Research 4867–4876 (Apr. 10, 1986).

Brennecke, Lelgeman, Geoid and Gravity Anomalies in the North Sea Area Derived From SEASAT–Altimeter Data, 7 Marine Geophysical Research 113–115 (1984).

Liang, The Adjustment and Combination of GEOS–3 and SEASAT Altimeter Data, Ohio State University, Jun. 1983.

Ohio State Univ. Columbus Dept of Geodetic Science, Report No. OGS–270, Dec. 1977, p. 31, Kearsley, "The Estimation of Mean Gravity Anomalies at Sea from Other Geophysical Phenomena".

W. Kearsley, NASA Contractor Report 141439, Apr. 1978, "The Prediction and Mapping of Geoidal Undulations from GEOS–3 Altimetry", pp. 1–68.

W. Kearsley, Report No. AFGL–TR–78–0069, Air Force Geophysics Laboratory, "the Estimation of Means Gravity Anomalies at Sea From Other Geophysical Phenomena", pp. 1–23.

Brennecke et al., 1983, Satellite Microwave Remote Sensing, Ellishorwood Limited Publishers, "The Altimetric Geoid in the North Sea", pp. 403–417.

Yazdani, Canadian Symposium on Remote Sensing–Aeronautics and Space Institute, 1987, pp. 233–241, "Processing of Seasat Altimetry Data on a Digital Image Analysis System".

Jones, Tectonophysics, vol. 99, No. 2–4, pp. 119–137, "Isostatic geoid Anomalies Over Trenches and Island Arcs".

METHOD FOR MAPPING SEA LEVEL UNDULATIONS WITH APPLICATIONS TO MINERAL AND HYDROCARBON PROSPECTING

This is a continuation-in-part application of application Ser. No. 136,710 filed 22 Dec., 1987, now U.S. Pat. No. 5,001,634, which was a continuation-in-part application of application Ser. No. 946,428 filed Dec. 23, 1986 (now abandoned).

BACKGROUND OF THE INVENTION

The present invention is concerned with prospecting and relates more particularly to a method of making for an area a map or a representation of local variations in the position of the geoid which have an amplitude less than about 1 m and are caused by density variations in the underlying sea floor, said map or representation being intended primarily for use in the determination of part areas of the sea floor with increased probability of deposits of natural resources of minerals and/or oil and gas bearing sediments. The density of which part areas distinguishes from that of the surroundings, downward bends in the geoid towards the sea floor indicating part areas having a density lower than that of the surroundings, and upward bends in the geoid from the sea floor indicating part areas having a density higher than that of the surroundings.

Hydrocarbon deposits sufficiently rich to justify exploitation occur in rock traps on land and below the sea floor. Sedimentary rocks containing these traps have a slightly lower density than the surrounding basement, which, apart from metamorphic rocks, also can consist of highly consolidated sedimentary rocks. This is one of the facts utilized in hydrocarbon prospecting operations.

For present day offshore hydrocarbon prospecting, use is made of a number of different techniques of which the following are the most important ones:

(a) Seismic surveying which involves the generating of acoustic impulses by means of an air or water gun and measuring of the acoustic signals reflected from certain geological markers below the sea floor by means of various types of sensors. The signals received fluctuate in time in response to the density variations in the different layers and formations below the sea floor and the depth to these layers and formations. The signals thus provide a geological picture indicating structures and main faults which could contain oil/gas accumulations.

(b) Magnetometric surveying which involves measuring the intensity and the direction of the terrestrial magnetic field.

(c) Gravimetric surveying which involves measuring minor variations in the vertical component of the gravitational field at the sea surface by means of an instrument which, in principle, comprises a spring-suspended sinker. The deflection of the instrument reflects the total force of gravity from all mass lying vertically between the location where the survey is carried out and the center of the earth. In other words, large mass densifications can contribute considerably to the deflection of the instrument even if they are at very large depths.

(d) Geological surveying and bottom samples by which it is intended, inter alia, to judge whether the conditions within the prospecting area during earlier geological times have been favourable to the formation of hydrocarbon-bearing areas, and it is investigated whether the rock is of the type in which oil/gas usually is to be found.

(e) Electrical surveying which involves investigating the character of the sea floor by resistivity measurements.

(f) Geochemical surveying. Hydrocarbon accumulations generally leak a certain amount of oil or gas to the overlying sediments and subsequently to the sea floor, and in some instances it is possible to trace and analyse these leaks by means of bottom samples.

All of these prior art techniques suffer from the disadvantage that they have to be performed physically on the area of investigation and thus that they become rather expensive in nature. Furthermore, the above techniques are not normally applied over large areas due to their costly nature and thus they do not possess any synoptic viewing. Since hydrocarbon prospecting by the above-mentioned techniques and, especially subsequent exploratory drillings are extremely expensive, large sums of money could be saved if the forecasting accuracy could be increased, in a way that areas of high probability for finds could be restricted prior to exploratory drillings.

In hydrocarbon and mineral prospecting on land, data are utilised which are collected by means of satellites for mapping areas with likely deposits. The techniques used for this purpose are colour television technique, picture analysis/processing and multispectral recording.

For off-shore applications such techniques are rendered useless, but, it is known that certain satellites are able to provide altimeter data, i.e. information about the distance between the satellite and the sea surface. A satellite revolves around the earth in a great circle plane. Since the earth rotates on its north-south axis, the satellite will gradually move back and forth within an area between specific north and south latitudes, the width of said area being determined by the orbital angle of the satellite. This area will eventually be scanned by the satellite which then will pass over the area along north-western and south-western tracks, crossing each other and forming a deformed grid pattern.

Altimeter data are measured at regular intervals along these tracks. At the crossing points of the tracks, the altimeter data will be recorded at different times for one and the same point. Because the tidal lift is different at different times, because the wind force is different, because the satellite is at different altitudes depending upon whether it has travelled over land or sea before it reaches the measuring point, etc., the altimeter data measured at different times will differ considerably at the crossing points. The differences may amount to ±5 meters.

By means of these altimeter data and information about the orbit of the satellite, it is then possible to calculate height values indicating the position of the sea surface in relation to a reference ellipsoid which is an imaginary ellipsoid representing the shape of the earth as accurately as possible based on the assumption that the earth is totally homogenous. These height values are used to study the undulation of the sea surface which is not entirely globular in shape, but slightly undulatory. In places where the force of gravity is stronger, the sea bulges slightly outwardly (water masses are attracted to these places), and in place where the force of gravity is somewhat less, the sea bulges slightly inwardly. The sea surface has, in other words, adapted itself to the difference in gravity pull along the surface of the earth. Further, if the sea surface is at complete rest it attains a surface with constant gravitational potential, a so-called geoid.

Up to now, the altimeter data have been utilised mainly for determining the position of the geoid, expressed in absolute numbers as height values above the reference ellipsoid. However, because of the difficulties involved in accurately determining the orbit of the satellite and in finding exact corrections for tides, waves, currents etc., only the variations in the geoid position which have a large spread and high amplitude could be determined. Scientific literature in this field gives examples of observations of variations in the geoid position of the order −40 m to +60 m. Variations of this order are entirely without interest for prospecting purposes and, besides, have not been utilised therefor. These variations essentially reflect the topography of the sea floor, the seamounts attracting water from the surroundings and raising the sea level, while the trenches lower the sea level, and have thus been utilised for mapping the sea floor topography.

Furthermore, it is generally accepted that there is isostatic equilibrium within large regions on the earth. This means that the mass of a column extending down to a fixed depth, below a certain area of the earth is the same as the mass of a column extending down to the same depth, below another, equally large area of the earth. If this were not the case, the column with the higher mass would sink relative to the column with the lower mass.

The Pratt-Hayford isostatic model suggests that the column have different densities for achieving the equilibrium.

The Airy-Heiskanen isostatic model proposes that all the columns have the same density, but have varying extensions into the denser mantle for achieving the equilibrium.

Two papers by Richard H. Rapp, "The Determination of Geoid Undulations and Gravity Anomalies from Seasat Altimeter Data", Journal of Geophysical Research, Vol. 88, No. C3, pp. 1552–1562, Feb. 28, 1983, and "Gravity Anomalies and Sea Surface Heights Derived from a Combined GEOS 3 Seasat Altimeter Data Set", Journal of Geophysical Research, Vol. 91, No. B5, pp. 4867–4876, Apr. 10, 1986, disclose a method of globally mapping the sea surface height expressed in absolute numbers above a reference ellipsoid. The method comprises obtaining height values which indicate the sea surface height in relation to a reference level and which have been calculated by means of altimeter data measured from a satellite and by means of information about the orbits of the satellite during measurement of the altimeter data; sorting out incorrect and improbable values; and adapting the height values corresponding to different orbits of the satellite to one another, such that maximum agreement of height values is obtained in the crossing points of the orbits. The values established for the variations in the sea surface height are, in addition, converted into variations in the gravity acceleration expressed in mGal.

It is the object of the present invention to determine local variations, i.e. variations less than 200 km in lateral extension, in the geoid position, which have an amplitude less than about 1 m and are caused by density variations in the underlying sea floor, and to make a map or representation of these variations, which can be used in prospecting for natural resources in the sea floor.

SUMMARY OF THE INVENTION

This object is achieved by means of a method as described above which further comprises the steps of filtering off long-wave variations with a wave length exceeding about 200 km in the geoid position; amplifying variations in the geoid position which have a selected spread; and adjusting the geoid position in respect of interference from the water depth and compensating it for isostatic effects, while taking into account any land within and close to said area.

In this manner, local undulations in the geoid can be found which are caused solely by the difference between the density in the underlying part of formations under the sea floor and the density in the surrounding parts of formations under the sea floor. In areas which lie underneath local downward bends in the geoid and which thus have a lower density than the surroundings, the chances of finding oil and gas bearing sediments are, as will appear from the above, greater than in other locations. In areas which lie underneath local upward bends in the geoid and thus have a higher density than the surroundings, the chances of finding oil and gas bearing sediments are, however, very small.

The reverse applies to deposits of ore and minerals which have a higher density than the bedrock in which they occur.

To be able to determine these local variations in the position of the geoid, which are caused by density variations in formations under the sea floor, the height values are adjusted such that any interference from larger-scale phenomena, such as tides, mass variations in the magma and other deep lying formations, etc. are eliminated. This adjustment is effected by filtering off long-wave variations with a wave length exceeding about 200 km in the geoid position. Furthermore, in order to achieve adequate accuracy, one merely considers relative height values of the geoid position and disregards any absolute height values of the geoid position.

To remove the effect of the sea floor topography on the geoid position, a water depth adjustment is carried out.

To remove the effect on the geoid position of layers with different densities and different thicknesses in the crust of the sea floor, a compensation for isostatic effects is carried out.

The resulting geoid, the so-called prospecting geoid, solely reflects density variations in the outer crust of the earth and thus could be used for prospecting purposes.

One advantage of this prospecting technique is that it is more reliable than conventional prospecting methods in forecasting basement topography and areas with sedimentary depositions. In areas where the method according to the present invention was used to determine that the geoid has a local downward bend of more than 25 cm, oil and gas bearing sediments have so far been found in about 70% of the exploratory wells being drilled in such areas. Generally, it may be said that downward bends in the high frequency portion of the prospecting geoid of more than about 10 cm are of interest to prospecting for commercially profitable accumulations of hydrocarbons. A further advantage of the invention is that one can predict with a high degree of accuracy in which areas there is no oil or gas bearing sediments to be found. In areas where the sea surface has an upward bend of 5 cm or more, almost none of hundreds of wildcats have encountered hydrocarbons (maximum oil/gas shows). The possibility of sorting out uninteresting areas is, of course, an important cost-saving factor in that exploratory drillings can be confined already at the outset to profitable areas.

Another advantage of this prospecting technique is that it can produce the density variations solely in the outer part of the earth's crust where hydrocarbon deposits can be profitably exploited. Deeper lying systems affect the geoid position over a large area, and the effect of these systems is eliminated by the filtering off of longwave variations.

The invention can be used universally for prospecting operations at sea. However, since it is extremely expensive to drill in areas with great depths of water, the method according to the invention is used primarily for prospecting operations on the continental shelves and slopes.

BRIEF DESCRIPTION OF THE DRAWINGS

An embodiment of the present invention will be described below, reference being made to the accompanying drawings in which.

DESCRIPTION OF THE PREFERRED EMBODIMENT

Figure 1:
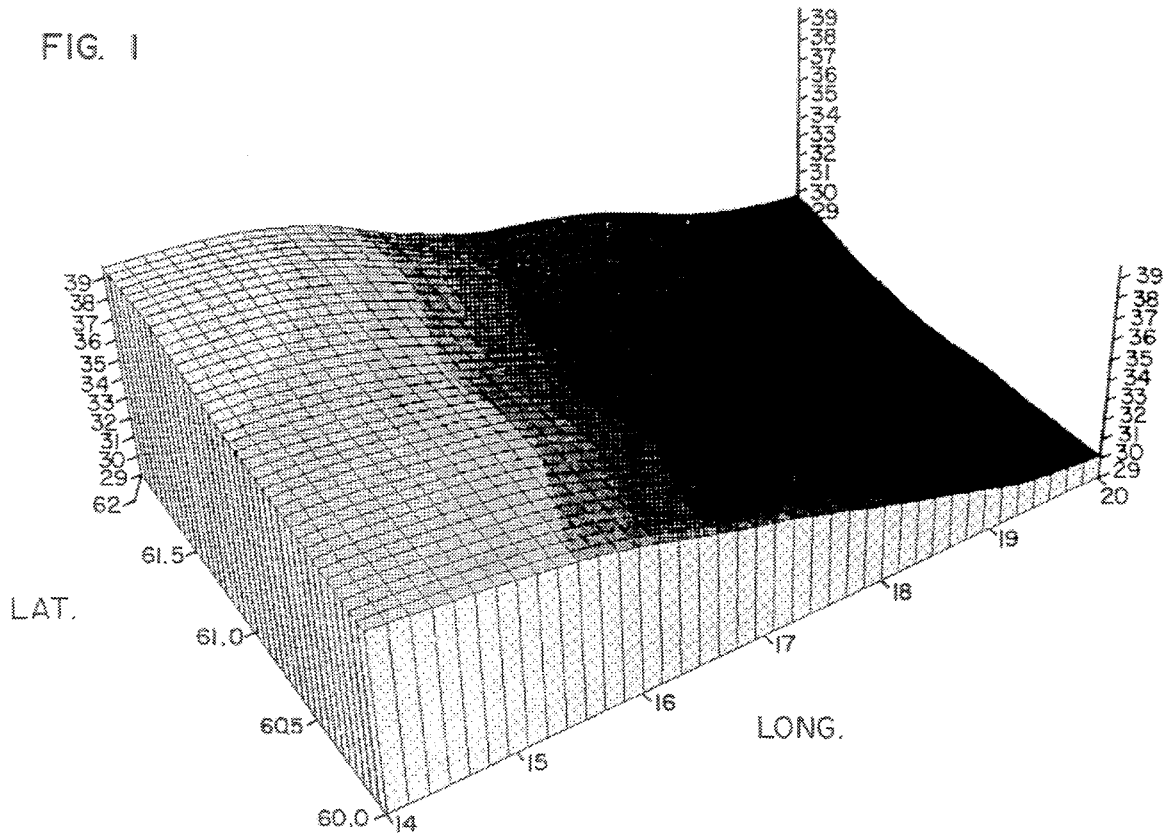
FIG. 1 is a simulated three-dimensional graphic representation of a first matrix containing interpolated altitude values.

A satellite travelling in an orbit of high accuracy samples, for example ten times every second, the distance to the sea surface by means of a radar altimeter. These altimeter data are transmitted to different ground stations in which data associated with too noisy and weak signals are sorted out. The remaining data and information about the satellite orbit are then used for calculating height values indicating the position for the sea surface in relation to a reference ellipsoid. These height values are then compiled in data bases from which they can be obtained for calculation purposes. Since collection of the altimeter data and calculation of the height values do not form part of the present invention, they will not be further described.

The height values calculated on the basis of said altimeter data are used, in accordance with the present invention, for determining local variations in the geoid position. These local variations are determined by adjusting the height values in different ways for large-scale phenomenon effects. The adjustments preferably are made by means of a computer, and the final result can be presented in the form of a map of the area investigated showing the regional variations in the geoid position, or in the form of profiles indicating the density variations in the sea floor, or in the form of some other representation, for example in the form of signals recorded on a magnetic tape and containing corresponding information.

The following is a description of how the method according to the invention is carried out by means of a computer. In the event that use is made of programs not commercially available, the expert in the field will have no difficulty in designing corresponding programs based on the information provided by the specification.

In a first step, the height values obtained from a data base are stored in a first file. The height values in this file are then checked in different ways in order to find and eliminate erroneous and improbable values.

The values are first checked for any undesired "double tracks", i.e. a doubled set of data from one and the same satellite track. Such double tracks may occur because several ground stations are receiving the same data. If a double track is detected, the data set associated with one of these tracks is removed.

After that, measuring values subjected to interference from land are sorted out. Since the radar waves are scattered while travelling between the satellite and the sea surface, each altimeter data actually is a mean value for one measurement area. If there is land within this measurement area, the altimeter measured value will be incorrect. All height values based on altimeter data whose measurement areas contain land must therefore be sorted out, and this is done by means of maps and on the basis of the information available about the size of each measurement area associated with a specific altimeter measured value.

After that, the height values are checked with respect to wave height, wind and standard deviation. In areas where the waves have been very high and/or the wind has been very strong when the altimeter data were recorded, corresponding height values are removed. Waves that are too high and winds that are too strong are reflected in that the standard deviation of the altitude values will be large.

Furthermore, the height values are checked with respect to Δ-altitude, i.e. the difference between two successive values, and ripple, i.e. the acuteness of the bend in the water surface. The reason for this correction is that there are physical limits to how much a water surface can incline.

Finally, a check is made of individual points and interruptions in tracks. In those cases where a satellite approaches land and passes over many islands, it may occur that only one measuring point at a great distance from the remaining measuring points from the track remains after removal of height values based on altimeter data subject to interference from land. Such a measuring point is then of slight value and is sorted out. It is also checked that the tracks no longer contain interruptions. In such a case, the tracks are sorted out.

After these corrections have been effected, the remaining height values are stored in a second base file. If desired, the computer can be used for plotting the height values associated with the different satellite tracks, which preferably is done by utilizing different colours in order to mark different heights above the reference ellipsoid. Such a graphic representation also provides an opportunity for subjective assessment of the height values. The plotting shows that height values based on altimeter data measured in the same point but at different times differ considerably because of several factors, as has been explained above. However, none of these factors is associated with the required density variations in the sea floor. The tracks may therefore be raised, lowered and angled such that maximum agreement is established at the crossing points, while maintaining the information about the density variations in the sea floor intact. For this reason, the above-mentioned elimination of incorrect and improbable values is followed by a step in which the tracks are adapted to one another such that maximum agreement between height values for different tracks is obtained at the crossing points.

This adaptation step is initiated by dividing the tracks into south-western and north-western tracks, whereupon the latitude and longitude of the crossing points as well as the time between the start of the track and each crossing point are calculated, the time calculation being based upon exact information about the time interval between each measuring point.

After the positions of the crossing points have been determined, a main track and a control track are selected. The main track is selected among the south-west tracks and preferably should extend as far as possible through the search area, i.e. essentially diagonally. The control track is selected among the north-west tracks and should also extend as far as possible through the search area. If there is no sufficiently long control track, two control tracks may be selected. During the subsequent adaptation of the track positions to one another, the main track is maintained fixed, and neither its height nor its angular position is changed. The angular position of the control track also remains unchanged during the subsequent adaptation, but its height may be changed such that the control track will intersect the main track.

The main track and the control track define a plane to which the remaining tracks are adapted in the best possible way in that they are raised or lowered as well as angled. This adaptation is based upon the least square method and can be carried out by means of a commercially available calculation program from the NAG library. The input data to this calculation program are a matrix containing the latitude and longitude of the crossing points, the height difference for each crossing point and the time from the start of the track to the crossing point, as well as information about which track is the main track and which is the control track. From this calculation program, a result file is obtainable which indicates the height difference between the tracks at the crossing points and the mean height difference for all crossing points. By studying these data, individual points or whole tracks may be found which obviously are incorrect and should be eliminated. The adaptation is repeated until a satisfactory result has been obtained.

The output data from the calculation program are in the form of a correction file containing the magnitude of the angling and of the raising or lowering that must be carried out for each track. The height values in base file 2 are corrected by means of the corrections in the correction file, and the corrected height values are stored in base file 3.

Then, all superfluous data are stored out, and merely latitude, longitude and the corrected height value for each measuring point are retained and stored in a fourth base file. Upon adaptation of the satellite tracks to the main track and the control track, the height values have been made independent of the original reference ellipsoid. The height values thus are no longer absolute values in relation to the reference ellipsoid, but merely are relative values.

The measuring points do not cover the search area completely. In some parts of the area, the measuring points lie close together, whereas in other parts they are fairly sparsely arranged. To make the global or large-scale trend within the area quite clear, an interpolation is made by means of an interpolation method known as GINTP1, whereby a first matrix is obtained.

If desired, the first matrix may then be plotted by means of a printer or on the screen of the computer. FIG. 1 illustrates a simulated three-dimensional graphic representation of the first matrix, in which the x axis indicates longitude values, the y axis latitude values, and the z axis height values in meter above a reference level, i.e. the variation in height for the geoid position. The Figure clearly shows that the global trend resides in an inclination downwards in a direction toward greater longitude values.

After that, the fourth base file is corrected for the global trend by filtering off interferences from long-wave phenomena, such as tides. Filtration may be accomplished by, for example, calculation of a regression plane which is subtracted from the height values. A regression plane is the plane which best conforms to the height values and is determined, for example by means of the least squares method. When this plane is subtracted from the height values, the height values will "lie within the smallest possible interval". Alternatively, a two-dimensional trend function, which is determined by linear regression, can be subtracted from the height values to obtain the filtering off of long-wave phenomena. These techniques are well-known to the person skilled in the art and need not be further explained. Filtration may also be compared to a straightening-out of the entire search area, such that the altitude values will lie within the smallest possible interval, without on that account changing their inter-relationship. The operation may be compared to having a crumpled and sloping or warped paper, the folds of which correspond to the regional variations in the geoid position, and the slope or warp of the paper corresponding to the global trend within the search area. If the paper is straightened out, i.e. if the global trend is removed, no information about the regional variations has been lost, but these regional variations will be more readily comparable. In FIG. 1, the correction for the global trend implies that the plane is inclined such that the left-hand short end is lowered and the right-hand short end is raised.

Figure 2:
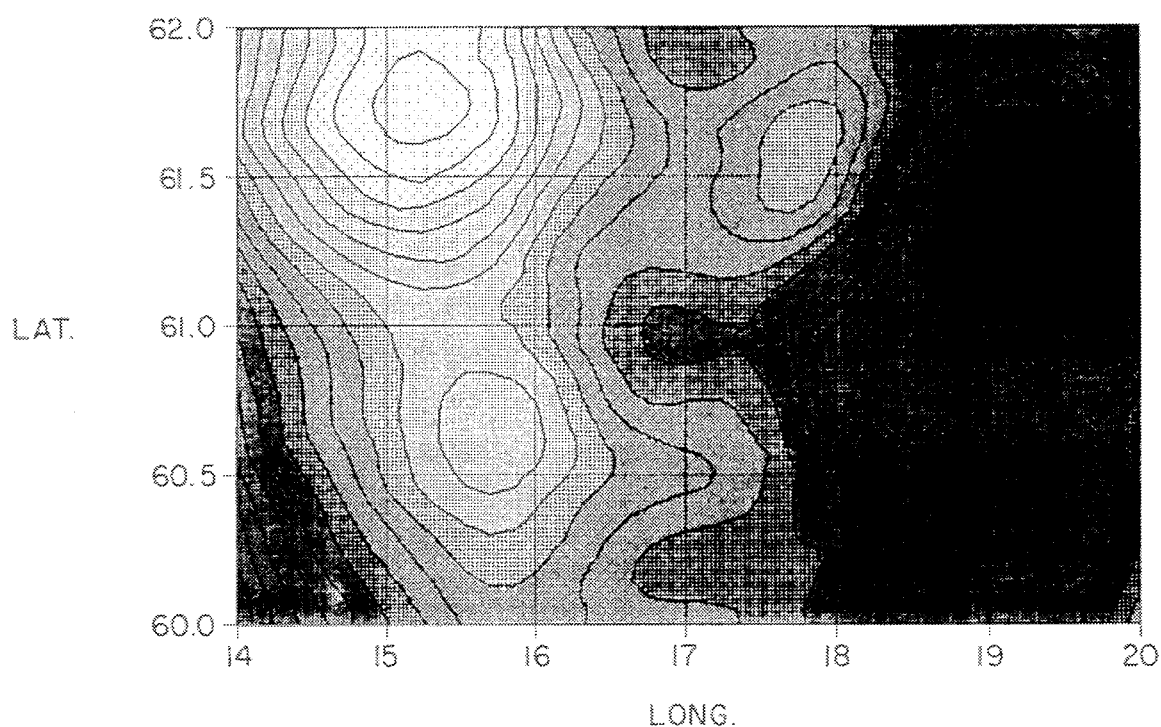
FIG. 2 is a graphic representation of a second matrix which is obtained after correction for the global trend.

The second matrix is illustrated graphically in FIG. 2 in which the x axis indicates longitude values, the y axis indicates latitude values, and height values within different intervals are illustrated by different rasterings. In the Figure, altitude isolines having a distance of 0.15 m have been drawn to make the height position of the geoid within the area appear more clearly. These isolines and the rasterings show that the geoid has a downward bend in an area between long 19°–20° and lat 61.0°–61.5°.

In subsequent steps, phenomena of the order which is of interest for oil/gas prospecting are studied and amplified. Amplification is achieved in the following manner. First, a square size is selected which depends upon the size of the phenomena to be studied. The square size may extend from about 10 km×10 km and upwards, and the squares need not be equilateral, but may just as well be rectangular. After the square size has been selected, a mean value of all height values within each square is formed, whereupon the mean value matrix is interpolated up to the same matrix size as the second matrix and is subtracted therefrom. The result is a third matrix showing variations in the geoid position of the size which is of interest to oil/gas prospecting.

Figure 3:
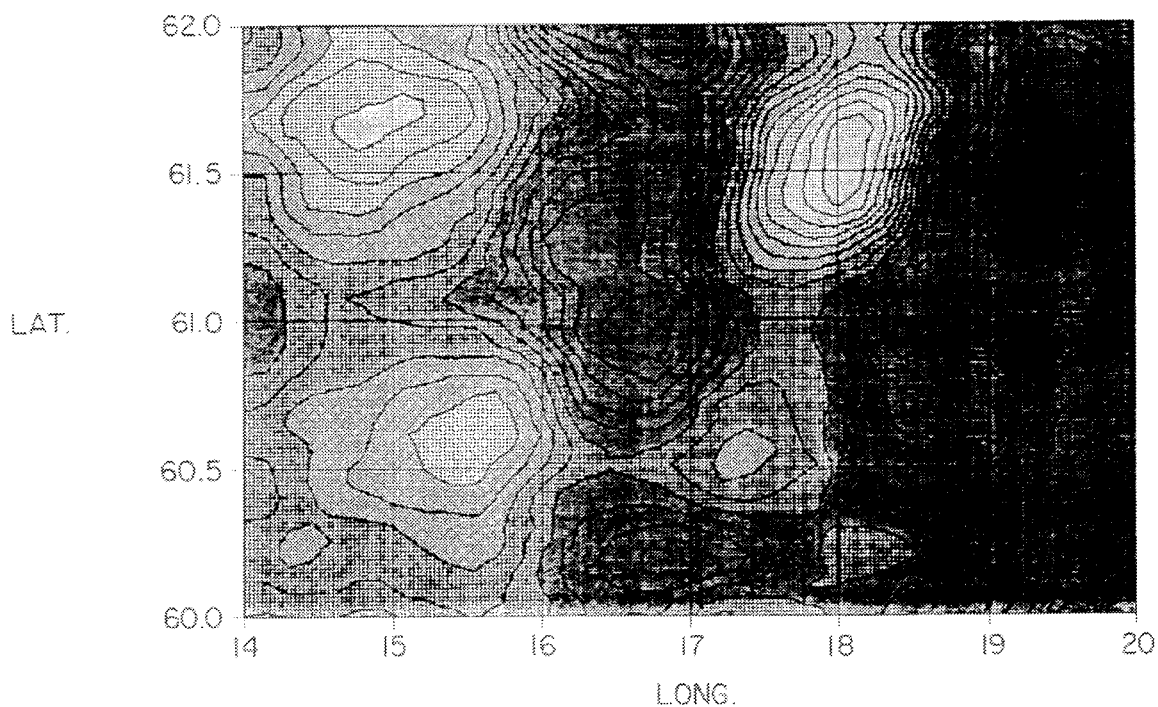
FIG. 3 is a graphic representation of a third matrix which is obtained after mean value formation within squares has been carried out.

The third matrix is illustrated graphically in FIG. 3 in which, as in FIG. 2, the x axis indicates longitude values, the y axis indicates latitude values, and altitude values within different intervals are shown by different rasterings. The distance between the altitude isolines in this Figure is 0.05 m. If FIG. 3 is compared to FIG. 2, it will be found that local bends not seen in FIG. 2 will appear in FIG. 3. In FIG. 3, for example, a local downward bend is shown at long 17°, lat 60.0°–60.5°, a bend which is not to be seen in FIG. 2.

Figure 4:
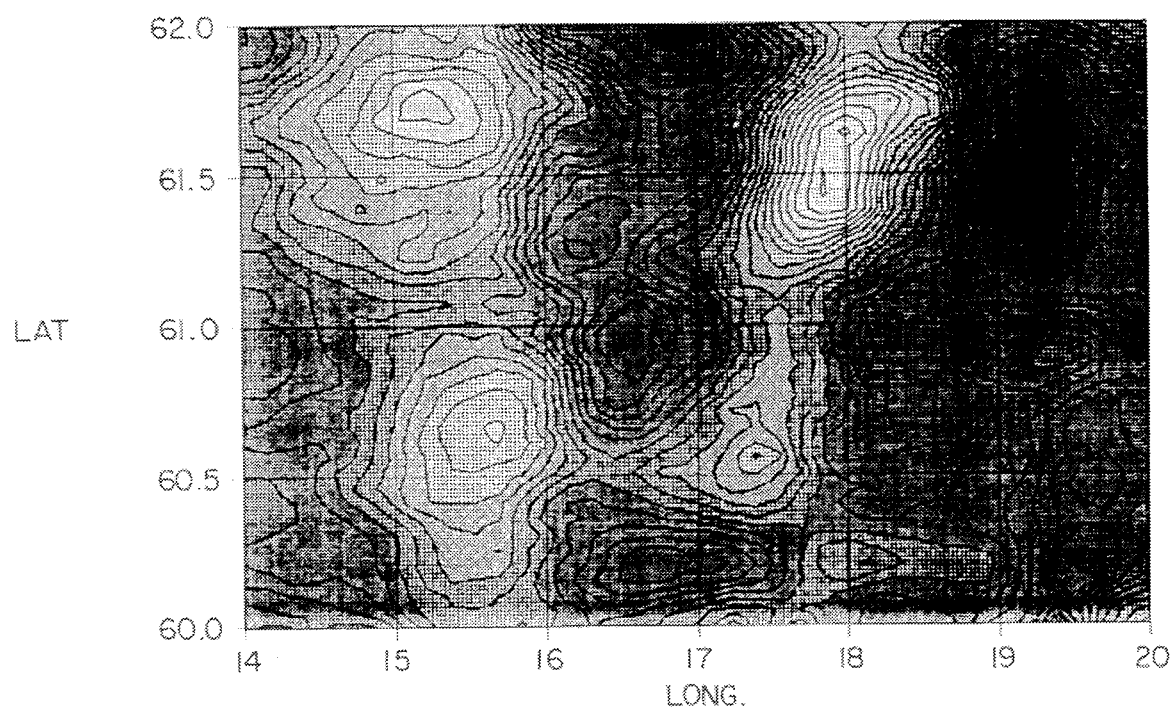
FIG. 4 is a graphic representation, corresponding to FIG. 3, of said third matrix, said mean value formation having been carried out within squares of a different size.

The step of mean value formation within squares of a selected size, and the subsequent upward interpolation, may be repeated for squares of different sizes, whereby phenomena of different sizes may be studied. This is shown in FIG. 4 which is a view corresponding to FIG. 3 and graphically illustrates the third matrix when said mean value formation within squares has been carried out with a smaller square size than in FIG. 3. In FIG. 4, the distance between the altitude isolines is but 0.025 m, and this means that bends having a smaller geographical extent than in FIG. 3 are shown.

Alternatively, the amplification may be achieved in the following manner. First a circular area around each height value in the second matrix is determined. Then a weighted mean value of the height values within each circular area is calculated, using a weighting function that decreases radially from the center of the circular area. Finally, the weighted mean value of each circular area is subtracted from the center height value in the corresponding circular area.

As already mentioned, the third matrix produced in this manner will reflect local variations in the geoid position. These variations depend upon the density conditions at the sea floor below the water surface, but also on the water depth (i.e. the sea floor topography), the isostasy and any land situated within or close to the investigation area. In order to refine variations in the geoid position depending upon density variations at the sea floor, it will therefore be necessary to eliminate the effect of the water depth and the isostasy while taking into account the effect of land, and this is done next.

To simplify the explanation, the water depth adjustment is described as one step followed by the compensation for the isostatic effects, although these adjustments preferably could be performed simultaneously by means of a calculation program designed for this purpose.

The mean sea surface or the geoid may be regarded as an undulating surface which is composed of several superimposed functions, one of which represents the effect of the water depth. The objective is to find the function which best represents the interference of the water depth with the undulating surface. This function will be the one which causes the greatest attenuation of the undulating surface, when subtracted therefrom.

On the continental shelves where it is economically feasable to drill for hydrocarbons, the sea floor topography normally has been carefully mapped on nautical charts. In this step, use is made of a chart covering the search area, and from this chart water depth data are taken which are digitalized. The water depth matrix produced in this manner is then interpolated to the same matrix size as the water surface matrix. Subsequently, a preferably square area is determined around each value in the water depth matrix, the size of the area depending on the density of values in the search area. Then a water column extending vertically of each square area and having a length equal to the water depth in the square is determined.

To establish the effect of the water columns on the geoid position, each water column is replaced with a column having the same volume, but a density which is approximately the same as the mean density of the upper crust of the sea floor. Then, for each water depth value in the matrix, the contribution T to the geopotential at the water surface due to the replacement of the water columns by mass columns with a different density, is calculated by well-known methods. In this connection, account is taken of mass columns within a radius of about 100 km. If this area with a radius of about 100 km includes land, the geoid position is compensated also for masses on land since these will affect the mean sea surface level close to the coast. Thus, high mountains close to the coast will attract water and raise the mean sea surface level. For the purpose of land compensation, which could be seen as a negative water depth adjustment, all land above sea surface level is replaced with an equal volume of air in the same manner as the water is replaced with a mass of a different density. For these water depth values in the water depth matrix which are affected by land within a radius of 100 km, the contribution T to the geopotential at the water surface due to the replacement of the land columns by air columns is calculated. It is understood, that the contributions T due to the land compensation will affect the geoid position in the opposite direction as compared to these from the water depth adjustment. The total geopotential contribution T for each water depth value in the water depth matrix is converted into a height difference $\Delta H$ by using Bruns' formula $\Delta H = T/\gamma$, where $\gamma$ is the normal gravitation. This results in a matrix having correction values indicating how the water mass or water depth affects the geoid position.

The calculations described above is repeated for different density values of the replacement mass columns, e.g. between 1.5 $g/cm^3$ and 3.0 $g/cm^3$, whereby a set of water depth correction matrixes is obtained.

However, to obtain a prospecting geoid, which solely reflects the local density variations in the outer crust of the sea floor, it is also necessary to compensate the geoid position for the isostatic effects. This could be done in the following manner: An isostatic multi-layer model is used, which comprises a granitic layer with a density of $\rho=2,74$ $g/cm^3$, a basaltic layer with a density of $\rho=3,21$ $g/cm^3$ below the granitic layer, and a mantle with a density of $\rho=3,32$ $g/cm^3$ below the basaltic layer. It is assumed that, under land, the thickness of the granitic and basaltic layers increases substantially linearly with the distance to the sea, while the thickness of the granitic and basaltic layers decreases and the thickness of the mantle increases below the sea floor with increasing water depth to achieve the isostatic equilibrium.

First the search area is divided into square areas in exactly the same manner as for the water depth adjustment. Then a column extending vertically of each square area down to a compensation depth of e.g. 33.2 km, is determined. (The compensation depth has in this example been chosen to be the depth to the mantle layer at the boundary between land and sea). To establish the isostatic effect on the geoid position, the part of each column that is composed of the mantle layer is replaced with a part having the same volume, but the density of the basaltic layer, i.e. 3.2 $g/cm^3$ according to the model above. Then, for each square area, the contribution T to the geo-potential at the sea surface due to the replacement of the mantle part columns with the basaltic part columns, is calculated by well-known methods. As before, account is taken of masses within a radius of about 100 km. If this area with a radius of about 100 km includes land, the geoid position is compensated also for the mass-conditions on land. If there are high mountains on land, the depth to the mantle will be larger than at sea due to the isostatic equilibrium, and thus the geoid position will be affected. To compensate for this effect, the basaltic layer from the compensation depth down to the beginning of the mantle layer is replaced with an equal volume of mass having the same density as the mantle, i.e. 3.3 $g/cm^3$ according to the model above, in the same manner as the mantle layer is replaced with a basaltic layer below the sea. For the square areas in the investigation area which are affected by land within a radius of 100 km, the contribution T to the geopotential at the sea surface due to the replacement of basaltic columns by mantle columns is calculated. It is understood that the contributions T due to the isostatic effects on land will affect the geoid position in the opposite direction as compared to these due to the isostatic effects below the sea. The total geopotential contribution T for each square area is converted into a height difference $\Delta H$ by using Bruns' formula.

The height difference ΔH for each square area is then multiplied by an isostatic factor, which reflects the flexural rigidity of the sea floor within the investigation area, i.e. how much of a vertical load the sea floor can support. This results in a correction matrix having correction values indicating how the geoid position is affected by the isostatic effects.

The calculations described above is repeated for different values of the isostatic factor, e.g. values in the range from about 0 to about 1.5, whereby a set of isostatic correction matrixes is obtained.

Then, by a two-dimensional regression analysis the density value and the isostatic factor are determined which in combination cause the greatest attenuation of the geoid position, when the corresponding water depth and isostatic correction matrixes are added to the third matrix.

The fourth matrix, obtained by adding the water depth and isostatic correction matrixes corresponding to the thus determined density value and isostatic factor, is the finished matrix which shows local variations in the geoid position caused by density variations in the sea floor. In areas where the sea surface has a downward bend i.e. where the density at the sea floor is lower than in the surroundings, the prospects of finding oil and gas bearing sediments are comparatively good. In areas where the sea surface has an upward bend, i.e. where the density at the sea floor is higher than that of the surroundings, the prospects of finding oil and gas bearing sediments are very low. To minerals and ores, the reverse applies.

If desired, the fourth matrix may then be further processed by calculating how the geoid is affected by known geological systems (salt lentils, salt plugs, high density systems, etc.).

If desired, the height values of the fourth matrix may also be converted into gravity values.

Figure 5A:
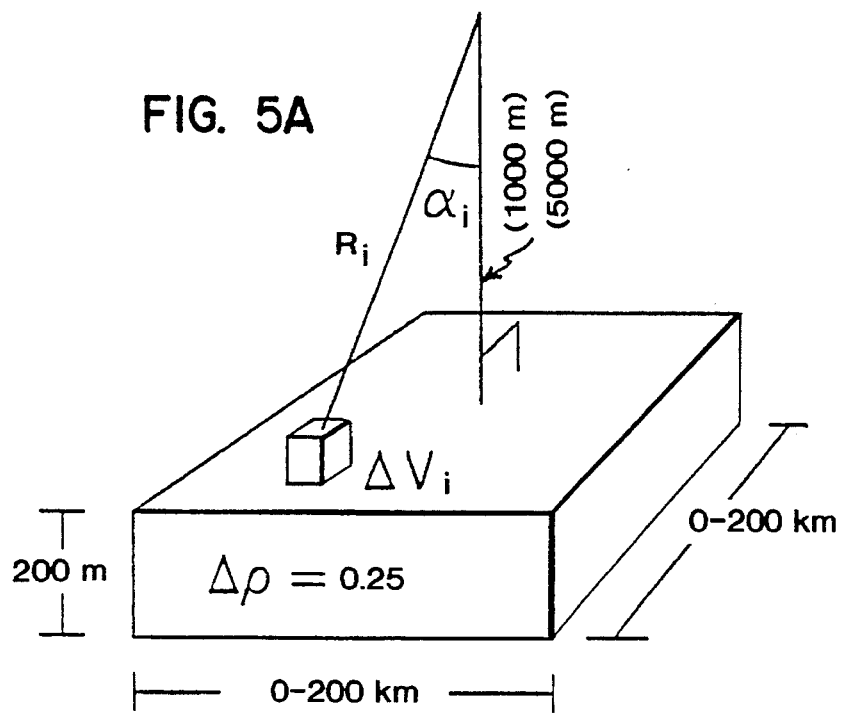
FIG. 5a and b are diagrams illustrating the interference of layers of varying extension on the geoid position with gravitation.

FIG. 5a and b, finally, illustrate a comparison between the method according to the invention and prior art gravimetrical technique for an assumed part area, the density of which distinguishes from that of the surroundings and which is in the form of a square block having a thickness of 200 m.

The interference of the part area with the geoid position is calculated by means of the formula $$\Delta h \approx \Sigma\Sigma\Sigma \frac{G \times \Delta\rho \times \Delta V_i}{g_o \times R_i}$$

Wherein Δh is the change in the geoid position caused by the assumed deposit;

G is Newton's gravitation constant=$6.67 \cdot 10^{-11}$ Nm$^2$/kg$^2$;

Δρ is the density difference between the surroundings and the deposit and has been set at 0.25 kg/dm$^3$;

$\Delta V_i$ is a volume element in the form of a cube whose side is 100 m;

$g_o$ is the normal gravity acceleration=9.80 m/s$^2$;

$R_i$ is the radial distance expressed in meters from said volume element to the point on the water surface for which Δh is determined;

and the summation is carried out for all volume elements $\Delta V_i$.

The interference of the part area with the gravity acceleration is calculated by means of the formula $$\Delta g \approx \Sigma\Sigma\Sigma \frac{G \times \Delta g \times \Delta V_i}{R_i^2} \cos\alpha_i$$

wherein Δg is the change in the gravity acceleration caused by the interference from the part area $\alpha_i$ is the angle between the vertical line and the radial line to said volume element $\Delta V_i$, the remaining parameters have the same significance as in the above formula, and the summation is carried out for all volume elements $\Delta V_i$.

Figure 5B:
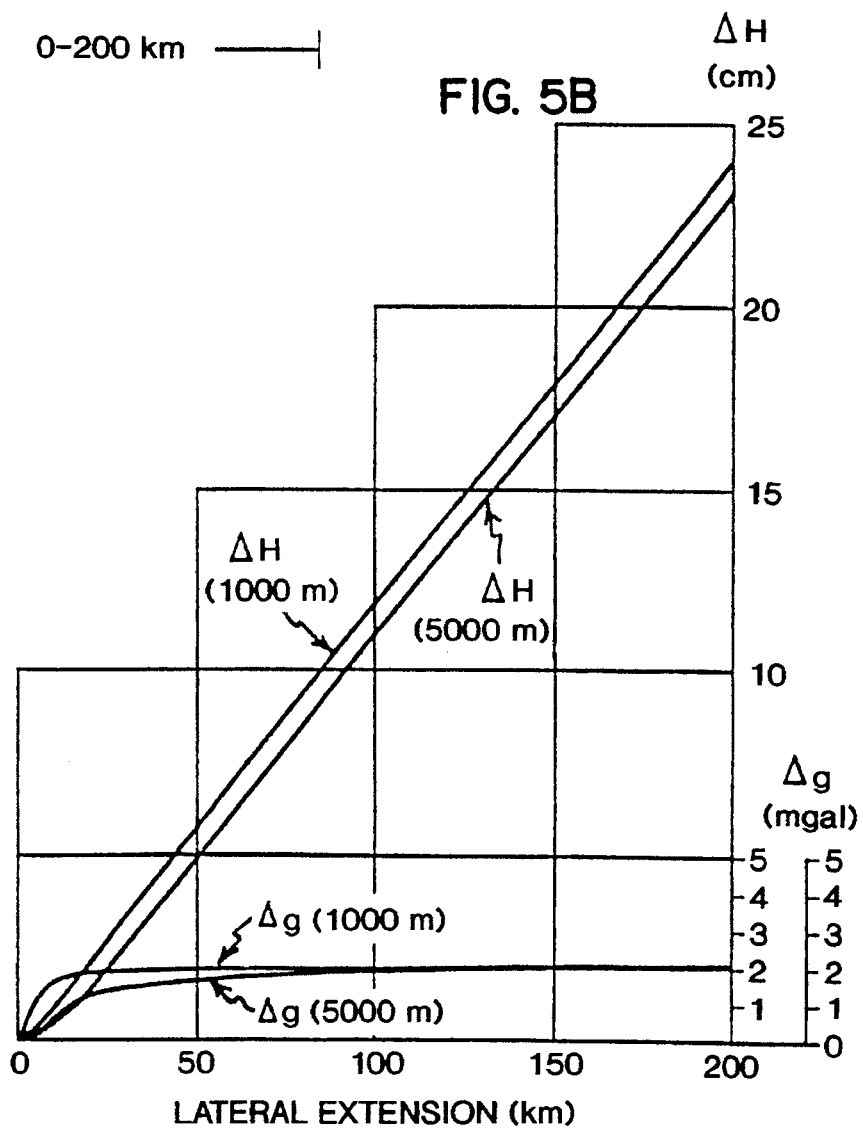
Figure 6:
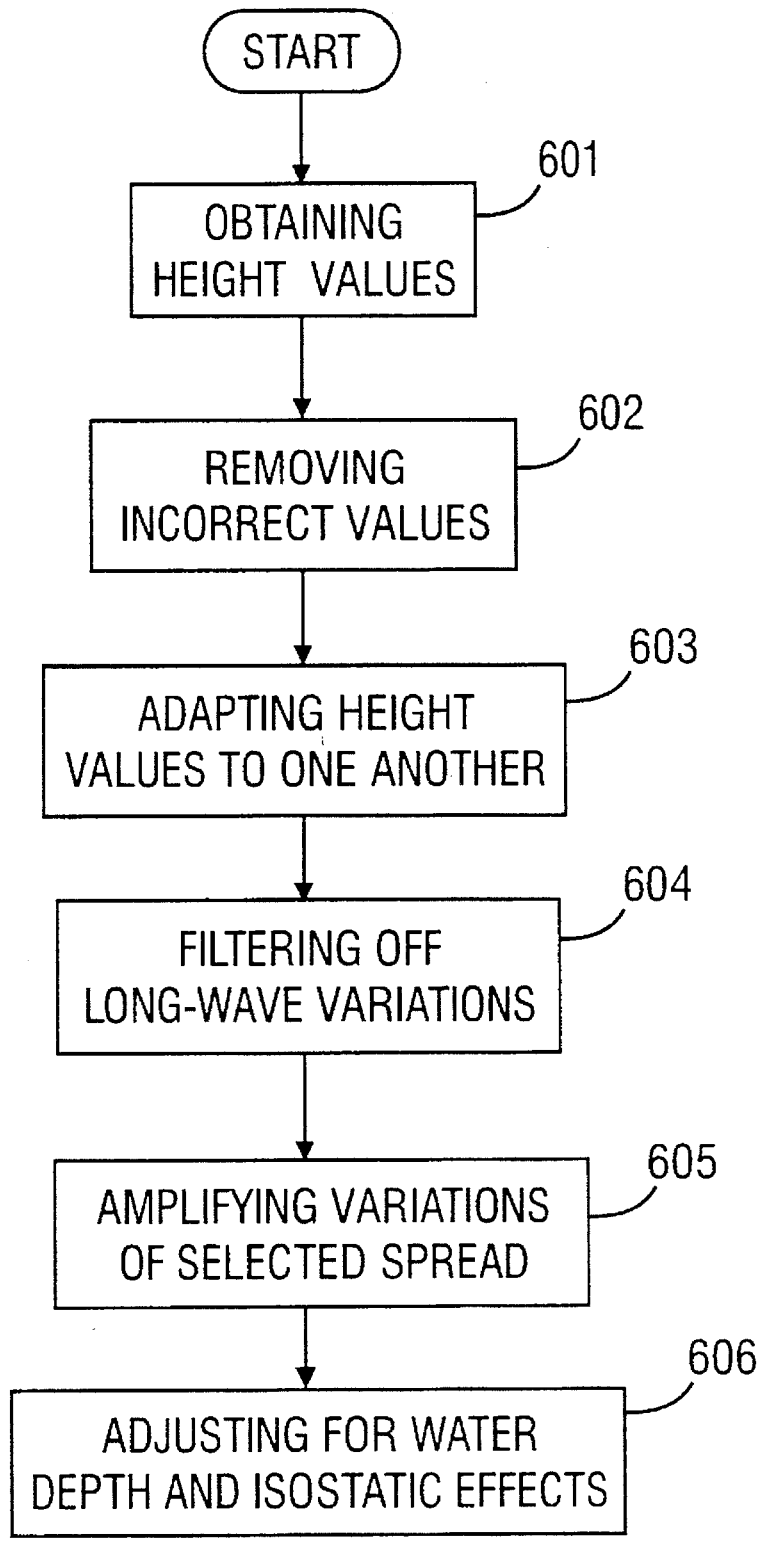
FIG. 6 is a flow chart of the general steps of one aspect of the invention.
Figure 7:
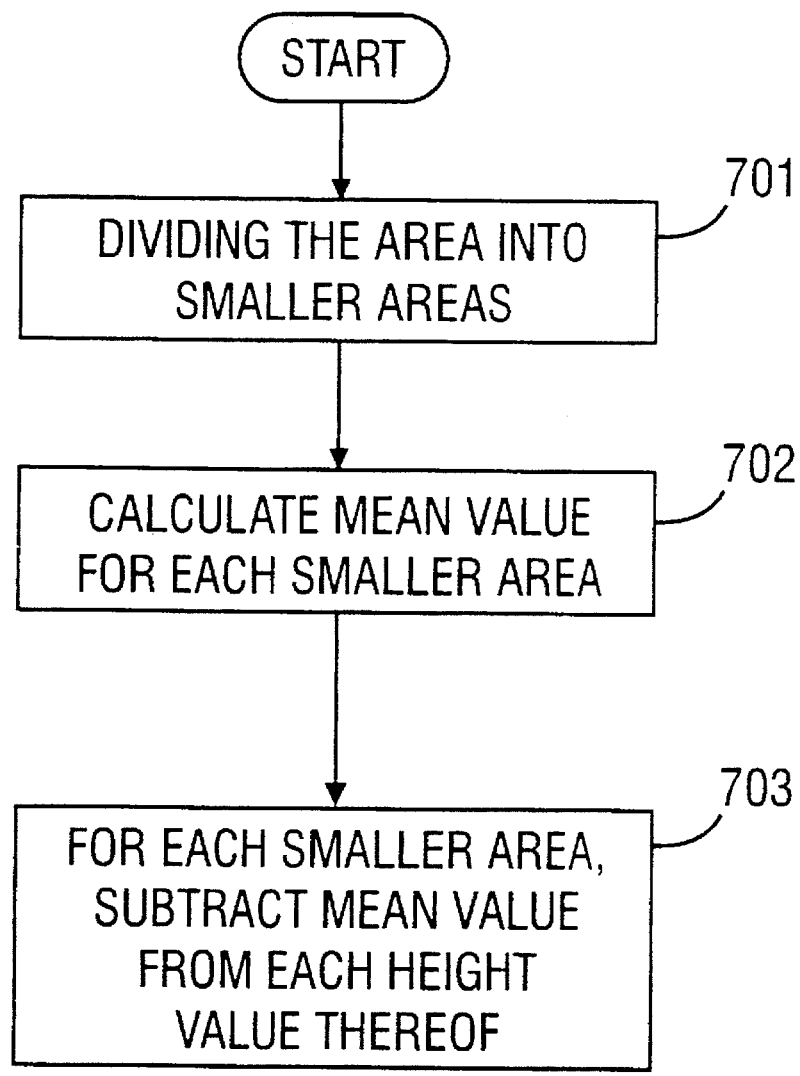
FIG. 7–11 are flow charts of further or alternative features of the invention.
Figure 8:
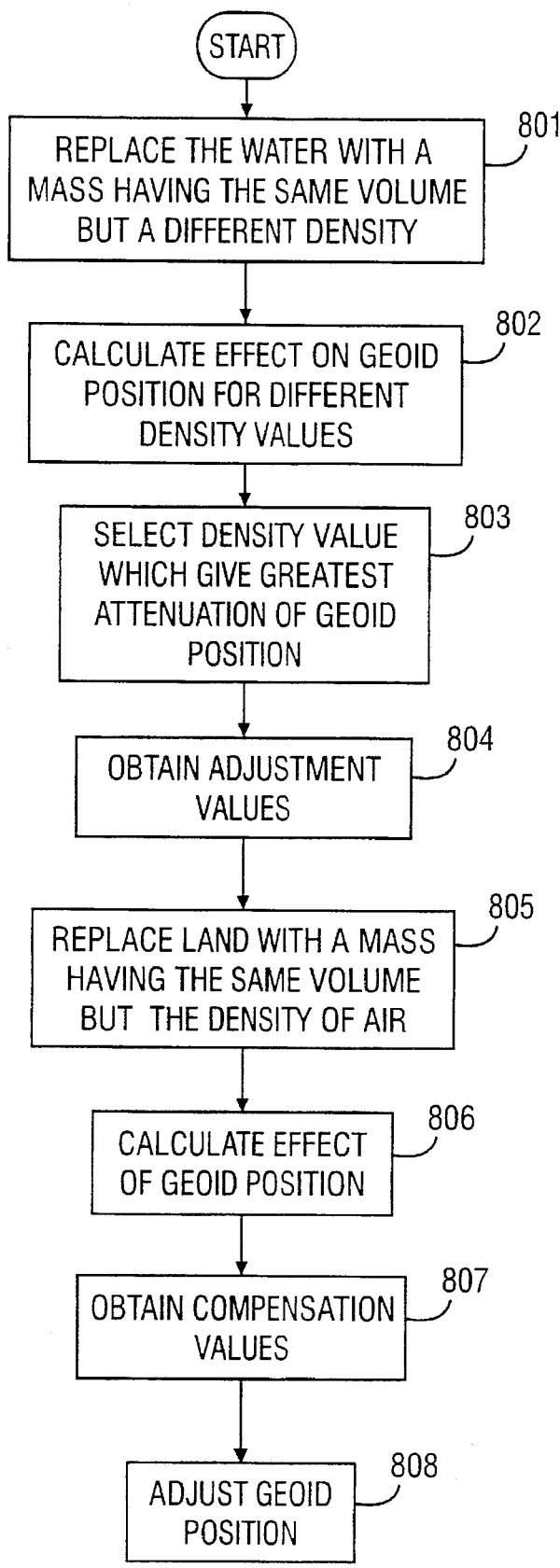
Figure 9:
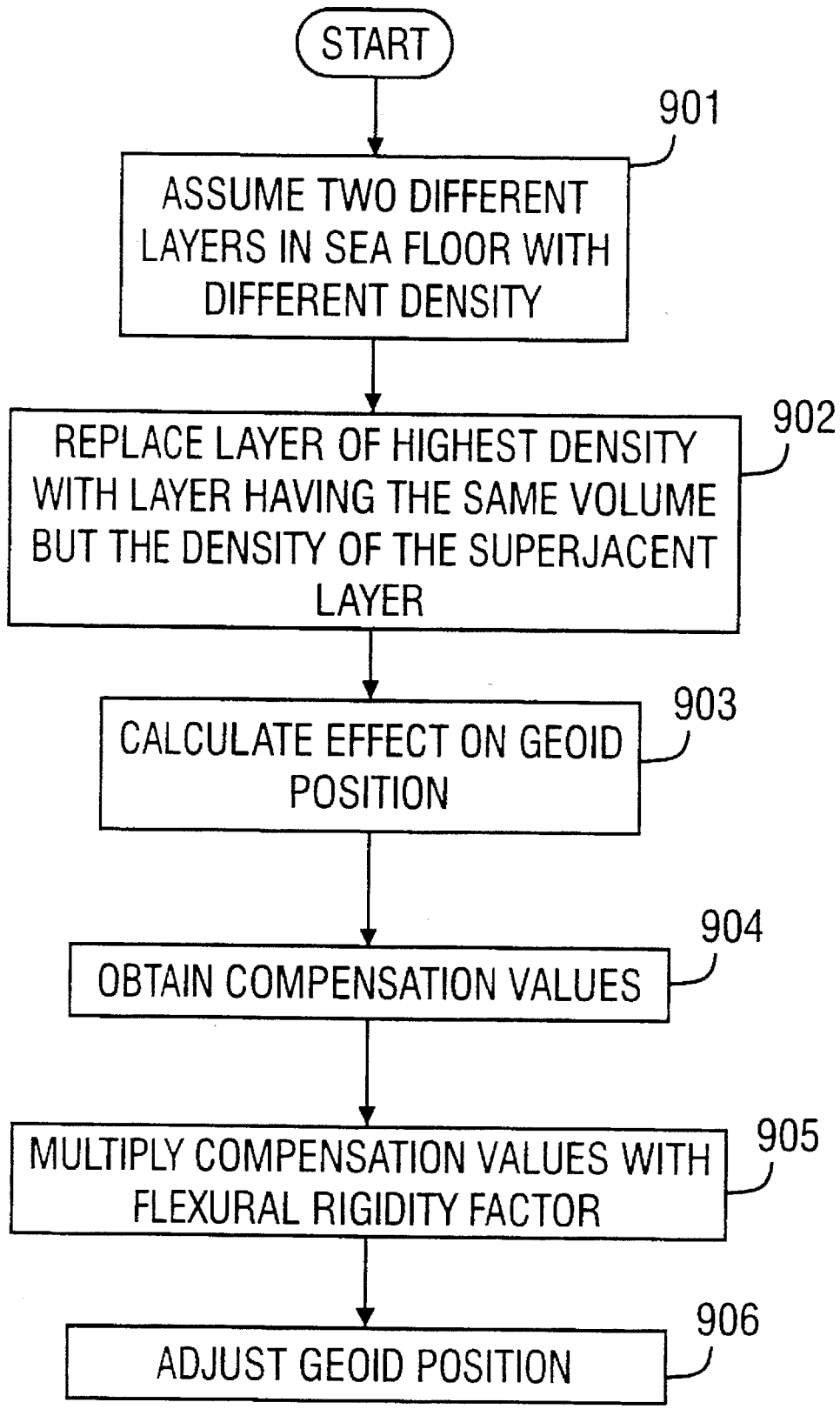
Figure 10:
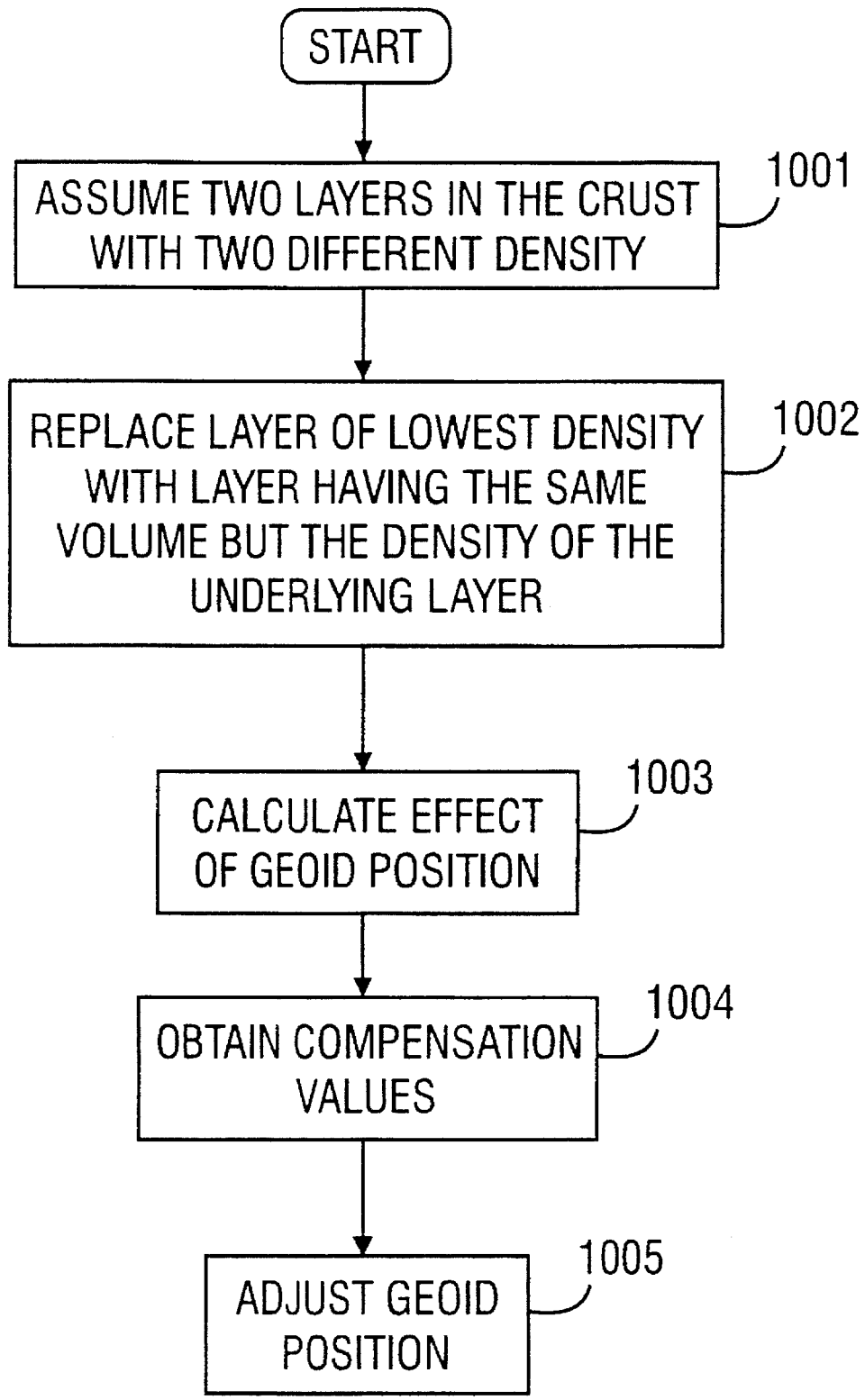
Figure 11:
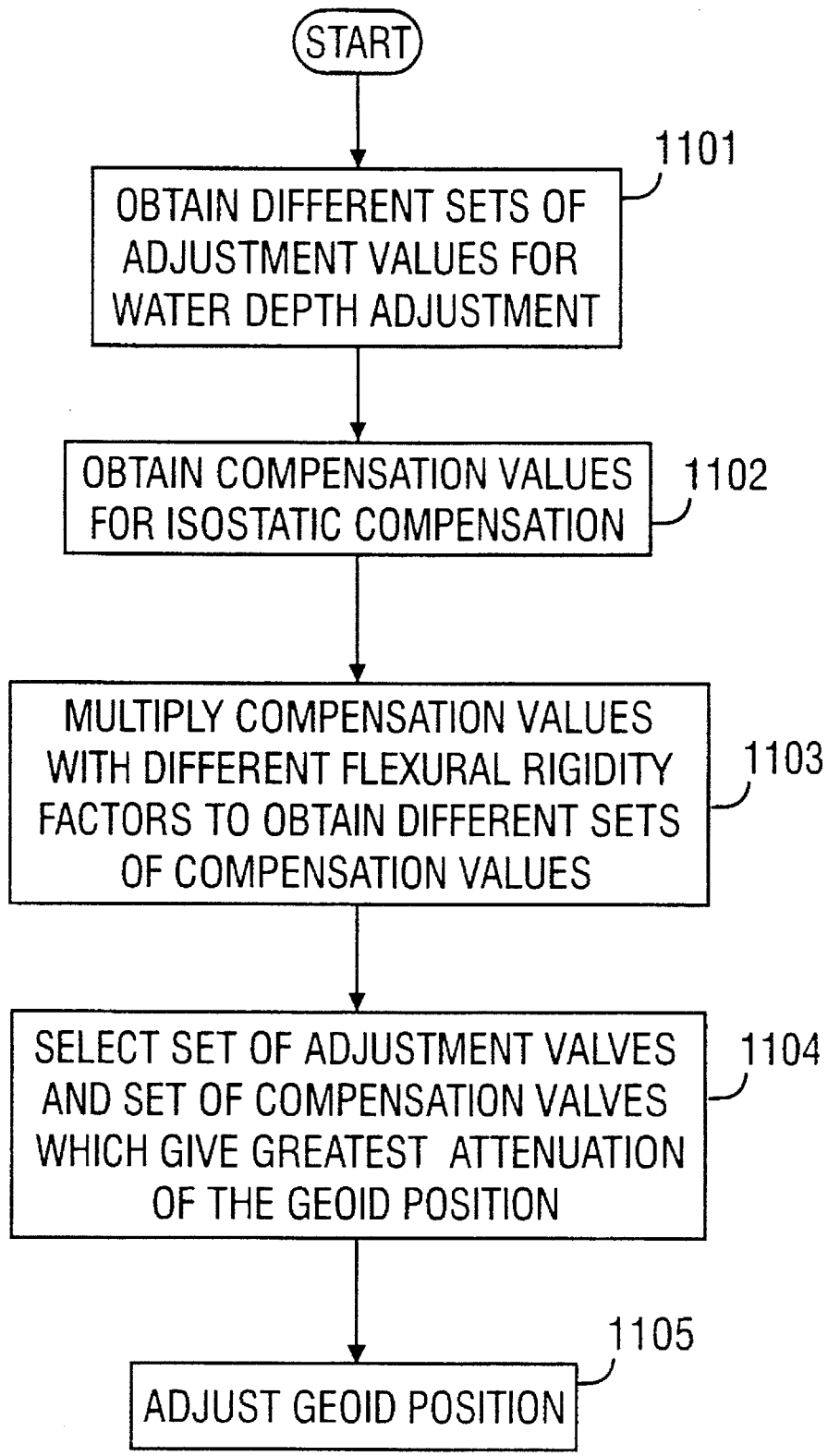

The result is plotted in the diagram shown in FIG. 5, Δh being given in centimetres and Δg in mGals on the ordinate, and the extension of the part area being given in kilometres on the abscissa. The diagram clearly shows that Δh increases essentially linearly with the extension of the part area, while Δg relatively quickly attains a given value which it then retains regardless of the extension of the deposit. Even if Δh and Δg are not directly comparable, the calculations clearly indicate that Δh gives more reliable indications of widespread density variations and accordingly possibilities for the existence of large and commercially profitable sediments of hydrocarbon bearing rocks. The reason for this is that the part area merely affects the vertical component at gravimetrical measurements, whereas the water surface in each point is affected by the entire gravitation and thereby forms an equipotential surface. For part areas of large extension, the contribution to Δg by the volume element $\Delta V_i$ with a large angle $\alpha_i$ will be very low, while Δh is affected to a far greater extent.

FIGS. 6–11 with numerals 601–606, 701–703, 801–808, 901–906, 1001–1005, 1101–1105 are flow chart representations of aspects of the invention discussed above in the form of alternative embodiments or further refinements.

It is understood that the described method above could be modified in many ways within the scope of the appended claims. Other models than the multi-layer model described could be used as a basis for the isostatic compensation. The investigation area can be divided into smaller areas of various forms for the compensation, the adjustment, the amplification etc.

I claim:

1. A method executed by a computer of making for an area a map or a representation of local variations in the position of a geoid which have an amplitude less than about 1 meter and are caused by density variations in an underlying sea floor, said map or representation being intended primarily for use in determining part areas of the sea floor with increased probability of deposits of natural resources, the density of which part areas distinguishes from that of surroundings, downward bends in the geoid towards the sea floor indicating part areas having a density lower than that of the surroundings, and upward bends in the geoid from the sea floor indicating part areas having a density higher than that of the surroundings, said method utilizing height values which indicate sea surface height in relation to a reference level and which have been calculated by means of altimeter data measured from a flying craft and by means of location information about orbits of the flying craft during measurement of the altimeter data, said method comprising:

sorting out incorrect and improbable height values;

adapting the height values corresponding to different orbits of the flying craft to one another, such that maximum agreement of height values is obtained in crossing points of the orbits, whereby relative values of the geoid position are established;

filtering off long-wave variations with a wavelength exceeding about 200 km in the geoid position;

amplifying variations in the geoid position which fall within a preselected range of values;

adjusting the geoid position with respect to interference from the water depth down to the sea floor and compensating the geoid position for isostatic effects, while taking into account the effect of any land within or close to said area.

2. A method according to claim 1, wherein said amplifying step includes dividing the area into smaller areas, calculating the mean value of the height values adapted in accordance with the steps of adapting and filtering within each smaller area, and subtracting within each smaller area the calculated mean value of that smaller area from each of said height values within that smaller area.

3. A method according to claim 1, wherein said amplifying step includes determining a smaller area around each height value within said area, calculating a weighted mean value of the height values in each smaller area, and subtracting the weighted mean value of each smaller area from the height value in the center of the corresponding smaller area.

4. A method according to claim 1, wherein the step of adjusting the geoid position with respect to interference from water depth includes replacing water down to the sea floor within said area with a mass having the same volume as the water but having a density which is approximately the same as that in the sea floor, and calculating the effect on the geoid position caused by the replacement of the water with said mass to obtain adjustment values for adjusting the geoid position with respect to interference from the water depth.

5. A method according to claim 4, wherein the calculating of the effect on the geoid position is repeated for different density values for said mass, and the geoid position is corrected using the adjustment values which give the greatest attenuation of the geoid position.

6. A method according to claim 4, wherein the step of adjusting the geoid position with respect to interference from water depth further includes replacing the land above sea level with a mass having the same volume as the land but having the density of air, and calculating the effect on the geoid position caused by the replacement of land with said mass having the density of air to obtain adjustment values for adjusting the geoid position.

7. A method according to claim 1, wherein the step of compensating the geoid position for isostatic effects includes assuming that the sea floor comprises at least two layers with different density, the thicknesses of which vary depending on the water depth for providing isostatic equilibrium, replacing the layer with the highest density down to a fixed compensation depth below the sea with a layer having the same volume, but a density equal to that of the superjacent layer, and calculating the effect on the geoid position caused by the replacement of said layer of the highest density with said layer of a density equal to that of the superjacent layer, to obtain compensation values for compensating the geoid position for isostatic effects at sea.

8. A method according to claim 1, wherein the step of compensating the geoid position for isostatic effects includes assuming that the crust of the earth on land comprises at least two layers with different density, the thicknesses of which vary depending on the height of the land above the sea level for providing isostatic equilibrium, replacing, between a fixed compensation depth and the beginning of the layer with the highest density, the layer of said two layers which has the lowest density with a mass having the same volume, but a density equal to that of the two layers which has the highest density of the two layers, and calculating the effect on the geoid position caused by the replacement of said layer of the lowest density with said mass of a density equal to that of the layer to obtain compensation values for compensating the geoid position for isostatic effects on land.

9. A method according to claim 7, wherein the compensation values are multiplied by a factor reflecting the flexural rigidity of said area.

10. A method according to claim 9, wherein the step of adjusting the geoid position with respect to interference from water depth includes replacing water down to the sea floor within said area with a mass having the same volume as the water but having a density which is approximately the same as that in the sea floor, and calculating the effect on the geoid position caused by the replacement of the water with said mass to obtain adjustment values for adjusting the geoid position with respect to interference from the water depth;

wherein said method further comprises repeating, for different density values for said mass, said calculating of the effect on the geoid position caused by the replacement of water with said mass to obtain different sets of adjustment values;

repeating said multiplication of the compensation values by a factor for different values of said factor to obtain different sets of compensation values; and selecting the set of adjustment values and the set of compensation values which, in combination, cause the greatest attenuation of the geoid position for adjusting it with respect to interference from the water depth and compensating it for isostatic effects.

11. A method executed by a computer of making for an area a map or a representation of local variations in the position of a geoid which have an amplitude less than about 1 meter and are caused by density variations in an underlying sea floor, said map or representation being intended primarily for use in determining pan areas of the sea floor with increased probability of deposits of natural resources, the density of which part areas distinguishes from that of surroundings, downward bends in the geoid towards the sea floor indicating part areas having a density lower than that of the surroundings, and upward bends in the geoid from the sea floor indicating part areas having a density higher than that of the surroundings, said method utilizing height values which indicate sea surface height in relation to a reference level and which have been calculated by means of altimeter data measured from a flying craft and by means of location information about orbits of the flying craft during measurement of the altimeter data, said method comprising:

sorting out incorrect and improbable height values;

adapting the height values corresponding to different orbits of the flying craft to one another, such that maximum agreement of height values is obtained in crossing points of the orbits, whereby relative values of the geoid position are established;

filtering off long-wave variations with a wave length exceeding about 200 km in the geoid position;

amplifying variations in the geoid position which fall within a preselected range of values;

adjusting the geoid position with respect to interference from the water depth down to the sea floor and compensating the geoid position for isostatic effects, while taking into account the effect of any land within or close to said area;

wherein the adjustment of the geoid position with respect to interference from water depth includes replacing water down to the sea floor within said area with a mass having the same volume as the water but having a density which is approximately the same as that in the sea floor, and calculating the effect on the geoid position caused by the replacement of the water with said mass to obtain adjustment values for adjusting the geoid position with respect to interference from the water depth, and wherein the compensation of the geoid position for isostatic effects includes assuming that the sea floor comprises at least two layers with different density, the thicknesses of which vary depending on the water depth for providing isostatic equilibrium, replacing the layer with the highest density down to a fixed compensation depth below the sea with a layer having the same volume, but a density equal to that of the superjacent layer, and calculating the effect on the geoid position caused by the replacement of said layer of the highest density with said layer of a density equal to that of the superjacent layer, to obtain compensation values for compensating the geoid position for isostatic effects at sea.

12. A machine having a memory which contains a data representation generated by the method of claim 1.

13. A computer memory component which contains a data representation generated by the method of claim 1.

14. A program storage device encoding machine readable instructions for performing the method of claim 1.

15. A method of creating in a computer memory a representation for an area of local variations in the position of a geoid which have an amplitude less than about 1 meter and are caused by density variations in an underlying sea floor, said representation being intended primarily for use in determining part areas of the sea floor with increased probability of deposits of natural resources, the density of which part areas distinguishes from that of surroundings, downward bends in the geoid towards the sea floor indicating part areas having a density lower than that of the surroundings, and upward bends in the geoid from the sea floor indicating part areas having a density higher than that of the surroundings, said method utilizing height values which indicate sea surface height in relation to a reference level and which have been calculated by means of altimeter data measured from flying craft and by means of location information about orbits of the flying craft during measurement of the altimeter data, said method comprising:

sorting out incorrect and improbable height values;

adapting the height values corresponding to different orbits of the flying craft to one another, such that maximum agreement of height values is obtained in crossing points of the orbits, whereby relative values of the geoid position are established;

filtering off long-wave variations with a wave length exceeding about 200 km in the geoid position;

amplifying variations in the geoid position which fall within a preselected range of values;

adjusting the geoid position with respect to interference from the water depth down to the sea floor and compensating the geoid position for isostatic effects, while taking into account the effect of any land within or close to said area.

16. A machine having a memory which contains a data representation generated by the method of claim 15.

17. A computer memory component which contains a data representation generated by the method of claim 15.

18. A program storage device encoding machine readable instructions for performing the method of claim 15.

* * * * *